June 29, 1954
W. HOHNER
2,682,169
ROCKWELL HARDNESS TESTER
Filed July 7, 1953
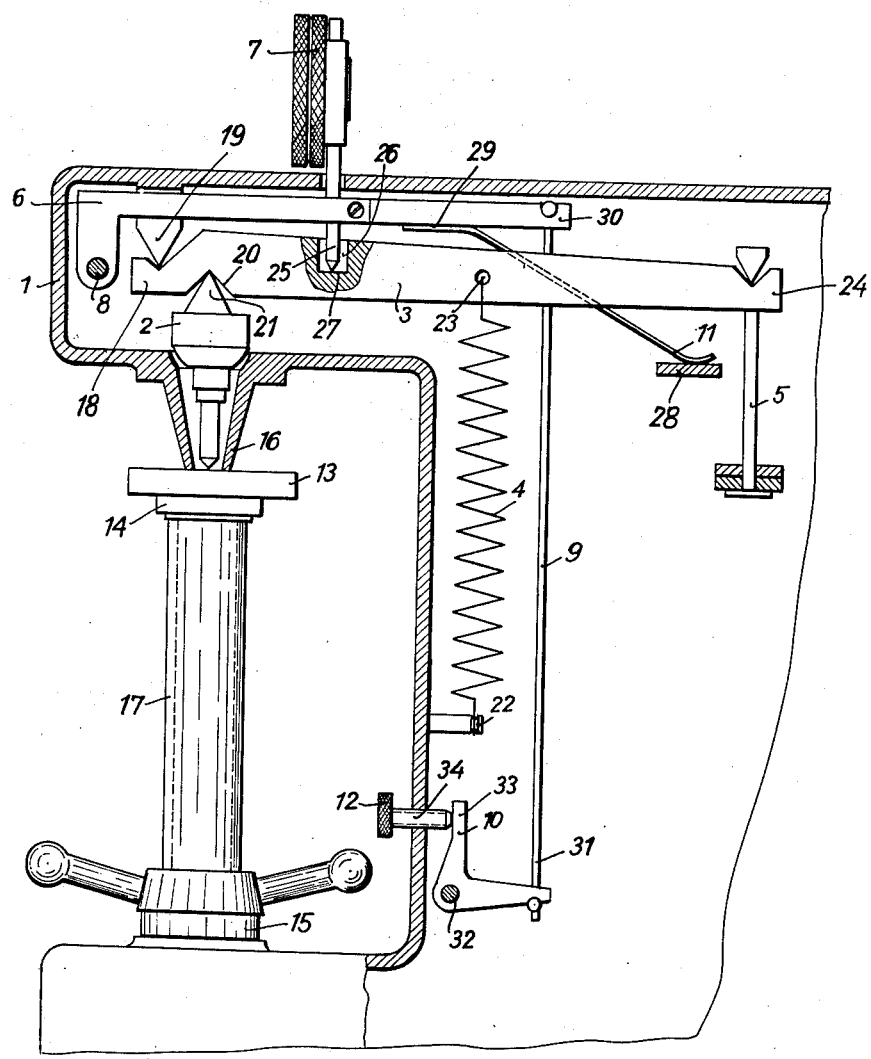
Inventor
Walter Hohner
By Patented June 29, 1954

2,682,169

UNITED STATES PATENT OFFICE 2,682,169

ROCKWELL HARDNESS TESTER

Walter Hohner, Zell, Germany, assignor to Georg Reicherter, Esslingen, Germany

Application July 7, 1953, Serial No. 366,404

Claims priority, application Germany October 16, 1952

6 Claims. (Cl. 73—83)

The invention is concerned with hardness testing apparatus and more especially with hardness testers operating after the Rockwell method in which the work to be tested, after having been at first subjected to a preliminary load which causes the elastic deformations to take place, is subsequently exposed to the influence of a major load, whereby the depth of the deformation caused by the said major load represents the respective hardness value.

In the known testing apparatus of the aforesaid kind the dial gauge is arranged on the machine frame at a level so high that the operator must very much raise his hands in order to reach the dial gauge when it is required to return the dial gauge pointer to the zero position before beginning the testing operation. However, this hand raising decidedly renders more difficult the task of the operator, and, therefore, the dial gauge will be damaged much more often.

It is, therefore, the main object of this invention to provide a Rockwell hardness tester of the general character described which enables the operator to return the indicator pointer of the dial gauge to its zero position without great corporal exertions so that its task be facilitated as much as possible during operation.

Another specific object of this invention is to provide a hardness tester in which the indicator pointer of the dial gauge can be returned to its zero position with the aid of operating means actuable from a point situated in the vicinity of the adjusting means serving to bring the work to be tested in the testing position.

Yet another object of this invention is to provide a hardness tester in which the indicator pointer of the dial gauge can be easily and accurately returned to its zero position so that the dial gauge be not damaged during use.

With these and other objects in view, which will appear as the description proceeds, the invention consists of certain novel features of construction as will be particularly pointed out in the appended claims.

The manner of carrying the invention into effect is hereinafter described by way of example, reference being had to the accompanying drawing, which is a schematical front view of a Rockwell hardness tester embodying the invention.

As is well known, the Rockwell process is a method of testing the hardness in which the errors due to elastic deformations are eliminated and which consists in applying to the work to be tested a preliminary load, then increasing the load from the preliminary load to the much larger main load, then again diminishing the load to the preliminary load, whereafter the depth of penetration is measured.

Referring more particularly to the drawing, 1 designates the frame of the hardness tester in which the testing mechanism is housed. The frame 1 is provided with a frustoconical testing head 16 with a vertically extending throughbore in which the test load-applying means 2, provided at its lower end in known manner with a testing penetrator, is arranged for up and down sliding movement. The work to be tested 13 is supported on a worktable 14 adjustable in a vertical direction by means of adjusting means consisting of a hand wheel 15 which cooperates with an elevating spindle 17 on the top of which the worktable 14 is mounted.

The load-transmitting lever 3 is pivotally mounted with its end 18 on a knife-edge 19 which is fixedly secured to the frame 1. The said lever 3 is provided with an acute-angled groove 20 resting upon a knife-edge 21, secured to the test load applying means 2, which test load applying means is pressed downwards when the lever 3 is pivoted in clockwise direction. The spring 4, the one end of which is connected to the frame 1 and the other end of which engages the lever 3 as at 23, serves to apply the preliminary load to the load-transmitting lever 3. The free end 24 of the lever 3 carries a holder bar 5 to which the corresponding weights are connected when the main load is applied to the work to be tested.

The supporting lever 6 is pivoted at 8 to the frame 1. A dial gauge 7 is so affixed to the lever 6 that its feeler member 25 projecting beneath the said lever 6 and housed in a recess 26 always contacts the lower face 27 of the recess 26 so as to respond to every pivotal movement of the lever 3. A counter-spring 11, the one end of which is fixed to a stationary part 28 of the machine, bears with its end 29 against the said lever 6.

The adjusting means serving to pivot the supporting lever 6, when required, consists of an actuating rod 9. The actuating rod 9 depends from the free end 30 of the lever 6. The lower end 31 of the actuating rod 9 is connected to a bell crank lever 10 pivoted at 32 to the machine frame 1. The arm 33 of the bell crank lever 10 is pressed against by a screw 34 screwed into the machine frame 1 and which can be adjusted by means of the handle 12 located in the vicinity of the hand wheel 15.

The manner of operation of the device is as follows:

The work 13 to be tested is placed on the test table 14 and is moved upwards by means of the hand wheel 15 and the elevating screw 17 cooperating therewith until it bears against the under surface 35 of the testing head 16. In this moment the preliminary load is applied to the work 13 to be tested by the force of the spring 4, and by the weight of the lever 3, both forces causing the lever 3 to pivot about its pivotal axis 18—19. This having been achieved, the indicator pointer of the dial gauge 7 is caused to be returned to its zero position. This is done by adjusting the screw 34 by means of the handle 12 so that the bell crank lever 10 is pivoted about its pivotal axis 32 thereby moving the actuating rod 9 in vertical direction. Since the said actuating rod 9 is connected to the lever 6, this latter is pivoted about its pivotal axis 8 thereby so displacing the feeler 25 of the dial gauge 7 with respect to the lever 3 that the indicator pointer of the said dial gauge is returned to its zero position. Subsequently the load is increased from the preliminary load to the main load by connecting weights to the holder bar 5, then the depth of the actual penetration is measured, and finally the load is again diminished to the preliminary load.

The foregoing description is directed solely towards the constructions illustrated, but I desire it to be understood that I reserve the privilege of resorting to all mechanichal changes to which the device is susceptible, the invention being defined and limited only by the terms of the appended claims.

Having thus described the invention, what I claim as new and desire to secure by Letters Patent is:

1. A Rockwell hardness tester comprising a frame with a testing head having a vertically extending throughbore, a worktable to support the work to be tested situated vertically beneath the said through-bore, adjusting means to vertically reciprocate said worktable, actuating means to impart motion to the said adjusting means, a test load-applying means slidably arranged in said through-bore of said testing head so as to move along its own vertical axis, and having at its lower end a testing penetrator and at its upper end a knife-edge, a test load-transmitting lever pivotally mounted on said frame and bearing against said knife-edge of said test load-applying means at a point spaced from its pivotal mounting, a preliminary load applying spring affixed to said frame and acting upon said load transmitting lever, a main load-applying means acting upon said load-transmitting lever when the main load is to be applied to the work to be tested, a supporting lever pivoted to said frame, an indicating means affixed to the previously mentioned supporting lever and having a feeler member always contacting the said test load-transmitting lever, adjusting means for pivoting said supporting lever so as to press the said feeler member of said dial gauge against said load-transmitting lever more or less intensively, as required, and operating means to operate said second mentioned adjusting means mounted on said frame and arranged in the vicinity of the said actuating means imparting motion to the said first-mentioned adjusting means.

2. A Rockwell hardness tester according to claim 1, wherein the said load-transmitting lever is provided with a recess situated beneath the said dial gauge and serving to so receive the said feeler member of said dial gauge that the lower end thereof always contacts the bottom of the said recess.

3. A Rockwell hardness tester according to claim 1, wherein the said second mentioned adjusting means consists of a vertically reciprocable actuating rod the one end of which engages the free end of the said supporting lever and the other end of which is so acted upon by the said operating means that by actuating the said operating means the actuating rod performs an up and down movement.

4. A Rockwell hardness tester according to claim 3, wherein the said operating means consists of a bell crank lever pivotable about an axis perpendicular to the longitudinal axis of the actuating rod, one arm of said bell crank lever being connected to the said actuating rod, and a longitudinally displaceable screw guided by the frame bearing on the other arm of said bell crank lever.

5. A Rockwell hardness tester according to claim 4, wherein the handle of the said screw is situated in the vicinity of the actuating means imparting motion to the first-mentioned adjusting means.

6. A Rockwell hardness tester comprising a frame having a bore in one of its walls, a test load-applying means slidably arranged in said bore of said frame so as to reciprocatingly move along its own axis, a worktable for supporting the work to be tested, adjusting means for moving the worktable towards the said bore or away therefrom, actuating means for imparting motion to the said adjusting means, a test load-transmitting means bearing against said test load-applying means so as to urge the latter through the said bore when load is applied thereto, a preliminary load applying means acting upon said test load-transmitting means, a main load applying means acting upon said test load-transmitting means when the main load is to be applied to the work to be tested, an indicating means having a feeler member always in contact with said test load-transmitting means so as to respond to every movement of the said test load-transmitting means when a load is applied thereto, a supporting means movably mounted on the frame to which supporting means the indicating means is affixed, and adjusting means mounted on said frame at a point near to the said actuating means, and serving to move the said supporting means with respect to the said load-transmitting means at will.

References Cited in the file of this patent

FOREIGN PATENTS

| Number | Country | Date |
|---|---|---|
| 384,885 | Great Britain | Dec. 15, 1932 |
| 568,911 | Germany | Jan. 26, 1933 |
| 749,444 | Germany | Nov. 25, 1944 |